US009164884B2

(12) United States Patent
Han et al.

(10) Patent No.: US 9,164,884 B2
(45) Date of Patent: Oct. 20, 2015

(54) DISPLAY CONTROLLER AND DISPLAY DEVICE INCLUDING THE SAME

(75) Inventors: Jong-Hun Han, Yongin-si (KR); Kyong-Ho Cho, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 434 days.

(21) Appl. No.: 13/613,332

(22) Filed: Sep. 13, 2012

(65) Prior Publication Data

US 2013/0106883 A1 May 2, 2013

(30) Foreign Application Priority Data

Nov. 2, 2011 (KR) .................... 10-2011-0113157

(51) Int. Cl.
 *G09G 5/39* (2006.01)
 *G09G 5/34* (2006.01)
 *G06F 12/02* (2006.01)
 *G06F 12/10* (2006.01)

(52) U.S. Cl.
 CPC ............ *G06F 12/0223* (2013.01); *G06F 12/10* (2013.01); *G09G 5/346* (2013.01); *G09G 5/39* (2013.01); *G09G 2360/12* (2013.01)

(58) Field of Classification Search
 None
 See application file for complete search history.

(56) References Cited

U.S. PATENT DOCUMENTS

| 7,620,793 B1 * | 11/2009 | Edmondson et al. | 711/208 |
| 2002/0130876 A1 * | 9/2002 | Champion | 345/570 |

FOREIGN PATENT DOCUMENTS

| JP | 2006-023501 | * | 1/2006 | ............... G09G 5/00 |
| JP | 2006023501 | | 1/2006 | |
| JP | 2007-033759 | * | 2/2007 | ............... G09G 5/34 |
| JP | 2007033759 | | 2/2007 | |
| KR | 100123276 B1 | | 9/1997 | |

* cited by examiner

*Primary Examiner* — James A Thompson
(74) *Attorney, Agent, or Firm* — F. Chau & Associates, LLC

(57) ABSTRACT

A display controller is provided that includes a processing unit configured to process input data, a memory unit configured to store some of the processed input data before a transition signal is enabled, a memory management unit configured to map consecutive virtual addresses of an image displayed on a display panel to physical addresses of data stored in the memory unit, and a control unit configured to control the processing unit and the memory management unit in response to a control signal and configured to provide a range of virtual addresses designated by the transition signal in response to enablement of the transition signal such that the image is displayed on the display panel.

12 Claims, 15 Drawing Sheets

| VA | PA | VA | PA | VA | PA |
|---|---|---|---|---|---|
| VXA1 | Psx1 | VXA281 | Psx2 | VXA561 | Psx3 |
| . . . | . . . | . . . | . . . | . . . | . . . |
| VXA280 | Pex1 | VXA560 | Pex2 | VXA840 | Pex3 |

| VA | PA | VA | PA | VA | PA | VA | PA |
|----|----|----|----|----|----|----|----|
| VXA1 | Psx1 | VXA281 | Psx2 | VXA561 | Psx3 | VXA841 | Psx4 |
| . | . | . | . | . | . | . | . |
| . | . | . | . | . | . | . | . |
| . | . | . | . | . | . | . | . |
| VXA280 | Pex1 | VXA560 | Pex2 | VXA840 | Pex3 | VXA1120 | Pex4 |

| VA | PA |
|---|---|
| VXA1121 | Psx1 |
| . | . |
| . | . |
| . | . |
| VXA1400 | Pex1 |

| VA | PA | VA | PA | VA | PA |
|---|---|---|---|---|---|
| VYA1 | Psy1 | VYA241 | Psy2 | VYA481 | Psy3 |
| . | . | . | . | . | . |
| . | . | . | . | . | . |
| . | . | . | . | . | . |
| VYA240 | Pey1 | VYA480 | Pey2 | VYA720 | Pey3 |

| VA | PA | VA | DA | VA | PA | VA | PA |
|---|---|---|---|---|---|---|---|
| VXA1 | Psx1, Psx2 | VXA281 | Psx3, Psx4 | VYA1 | Psy1, Psy3 | VYA241 | Psy2, Psy4 |
| . | . | . | . | . | . | . | . |
| . | . | . | . | . | . | . | . |
| . | . | . | . | . | . | . | . |
| VXA280 | Pex1, Pex2 | VXA560 | Pex3, Pex4 | VYA240 | Pey1, Pey3 | VYA480 | Pey2, Pey4 |

DISPLAY CONTROLLER AND DISPLAY DEVICE INCLUDING THE SAME

CROSS-REFERENCE TO RELATED APPLICATION(S)

This application claims priority under 35 USC §119 to Korean Patent Application No. 10-2011-0113157, filed on Nov. 2, 2011, in the Korean Intellectual Property Office (KIPO), the contents of which are incorporated by reference herein in its entirety.

TECHNICAL FIELD

Exemplary embodiments relate generally to display devices, more particularly to a display controller and a display device including the same.

DISCUSSION OF THE RELATED ART

More and more data is demanded to be processed by a display device, and this causes the display device to consume more time and power for page transition on the screen.

SUMMARY

Exemplary embodiments provide a display controller that can enhance page transition performance and a display device including the display controller.

According to an exemplary embodiment, a display controller includes a processing unit, a memory unit, a memory management unit and a control unit. The processing unit processes input data and provides processed data. The memory unit stores some of the processed data before a transition signal is enabled. The memory management unit maps consecutive virtual addresses of an image displayed on a display panel to physical addresses of data stored in the memory unit. The control unit controls the processing unit and the memory management unit in response to a control signal and provides a range of virtual addresses designated by the transition signal in response to enablement of the transition signal such that the image is displayed on the display panel.

In an embodiment, the memory management unit may include an address mapper which maps the virtual addresses to the physical addresses.

In an embodiment, the memory unit may include at least first through fourth frame buffers separate from each other.

The processing unit may process the input data into consecutive pages of data, each of the consecutive pages of data corresponding to a resolution of the display panel, may store a first page of data in the first frame buffer, may store a second page of data in the second frame buffer and may store a third page of data in the third frame buffer under control of the control unit before the transition signal is enabled.

The address mapper may map consecutive virtual addresses of the first through third pages of data to physical addresses of the first through third frame buffers.

The processing unit may stores the fourth page of data in the fourth frame buffer in response to enablement of the transition signal and the fourth page of data may be subsequent to the third page of data.

The address mapper may map virtual addresses of the fourth page of data to physical addresses of the fourth frame buffer such that the virtual addresses of the fourth page of data are subsequent to the virtual addresses of the third page of data.

The processing unit may store a fifth page of data consecutive to the fourth page of data in the first frame buffer in response to the enablement of the transition signal, and the address mapper may map virtual addresses of the fifth page of data to physical addresses of the first frame buffer such that the virtual addresses of the fifth page of data are subsequent to virtual addresses of the fourth page of data.

In an embodiment, each of the first through fourth frame buffers has physical addresses which may be not consecutive to each other.

According to an exemplary embodiment, a display device includes a display panel and a display controller which controls the display panel. The display controller includes a processing unit, a memory unit, a memory management unit and a control unit. The processing unit processes input data and provides processed data. The memory unit stores some of the processed data before a transition signal is enabled. The memory management unit maps consecutive virtual addresses of an image displayed on the display panel to physical addresses of data stored in the memory unit. The control unit controls the processing unit and the memory management unit in response to a control signal and provides a range of virtual addresses designated by the transition signal in response to enablement of the transition signal such that the image is displayed on the display panel.

In an embodiment, the memory unit may include at least first through fourth frame buffers separate from each other, and the processing unit processes the input data into consecutive pages of data, each of the consecutive pages of data corresponding to a resolution of the display panel, stores a first page of data in the first frame buffer, stores a second page of data in the second frame buffer and stores a third page of data in the third frame buffer under control of the control unit before the transition signal is enabled.

When the enabled transition signal designates an intermediate page of data between the first page of data and the second page of data, the control unit controls the memory management unit such that an image corresponding to physical addresses mapped to virtual addresses of the intermediate page of data is displayed on the display panel.

When the enabled transition signal designates an intermediate page of data between the first page of data and the second page of data, the control unit controls the processing unit such that the fourth page of data subsequent to the third page of data is stored in the fourth frame buffer.

When a range of the virtual addresses includes an end address of the virtual addresses, the memory management unit remaps the range including the end address of the virtual addresses to a center range including a center address of the virtual addresses.

The transition signal designates a range of an image displayed on the display panel.

Accordingly, the display device can have reduced response time and current consumption.

BRIEF DESCRIPTION OF THE DRAWINGS

Illustrative, non-limiting exemplary embodiments will be more clearly understood from the following detailed description taken in conjunction with the accompanying drawings, wherein.

DETAILED DESCRIPTION OF THE EMBODIMENTS

Figure 1:
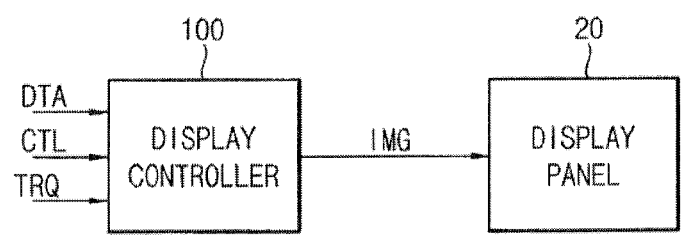
FIG. 1 is a block diagram illustrating a display device according to an exemplary embodiment.

Various exemplary embodiments will be described more fully hereinafter with reference to the accompanying drawings. The present inventive concept may, however, be embodied in many different forms and should not be construed as limited to the exemplary embodiments set forth herein. In the drawings, the sizes and relative sizes of layers and regions may be exaggerated for clarity. Like numerals may refer to like or similar elements throughout the specification and the drawings.

It will be understood that when an element is referred to as being "connected" or "coupled" to another element, it can be directly connected or coupled to the other element or intervening elements may be present. As used herein, the singular forms "a," "an" and "the" are intended to include the plural forms as well, unless the context clearly indicates otherwise.

FIG. 1 is a block diagram illustrating a display device according to an exemplary embodiment.

Referring to FIG. 1, a display device 10 includes a display controller 100 and a display panel 20.

The display controller 100 receives data DTA and a control signal CTL from an external source, receives a transition request TRQ from a user and outputs an image signal IMG to the display panel 20. The display controller 100 controls the display panel 20 such that an image is displayed on the display panel 20. The display panel 20, which actually displays an image in accordance with the image signal IMG, includes various display panels, such as an organic electroluminescent (EL) panel.

The data DTA provided from the external source represents a luminance value in color components, Red, Green, and Blue, of each pixel with respect to an image to be displayed. The control signal CTL includes longitudinal and lateral pixel number information of an image. The longitudinal and lateral pixel number information indicates the number of pixels in a longitudinal direction and a lateral direction of the image to be displayed. The control signal CTL includes rotation (flip) information of an image. Based on the rotation information of an image, an original image that is in a landscape mode is rotated, e.g., by 90°, so that the rotated image is displayed on a display screen of the display panel 20 which has a portrait mode.

Figure 2:
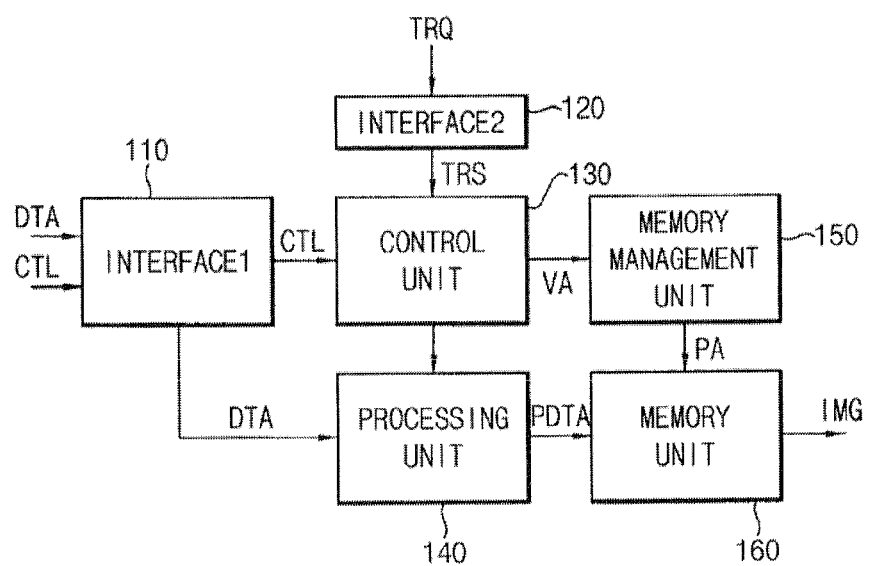
FIG. 2 is a block diagram illustrating an example of the display controller in FIG. 1 according to an exemplary embodiment.

FIG. 2 is a block diagram illustrating an example of the display controller in FIG. 1 according to an exemplary embodiment.

Referring to FIG. 2, the display controller 100 includes a first interface 110, a second interface 120, a control unit 130, a processing unit 140, a memory management unit 150 and a memory unit 160.

The first interface 110 receives the data DTA and the control signal CTL from the external source, provides the data DTA to the processing unit 140 and provides the control signal CTL to the control unit 130. The second interface 120 receives the transition request TRQ and provides a transition signal TRS corresponding to the transition request TRQ to the control unit 130. According to an embodiment, when the display device 10 is a notebook computer or a laptop computer, the second interface 120 is a mouse. According to an embodiment, when the display device 10 is a smart phone or a touch pad, the second interface 120 converts a user's contact to the transition signal TRS.

The control unit 130 controls the processing unit 140 and the memory management unit 150 in response to the control signal CTL. The control unit 130 provides virtual addresses VA designated by the transition signal TRS to the memory management unit 150 such that the image signal IMG is moved on the display panel 20 in response to the transition signal TRS.

The processing unit 140 processes the data DTA from the first interface 110, and the memory unit 160 stores processed data PDTA according to physical addresses PA provided from the memory management unit 150. The memory management unit 150 maps the physical addresses PA of the processed data PDTA stored in the memory unit 160 to consecutive virtual addresses VA of the image signal IMG displayed on the display panel 20. The virtual addresses VA corresponding to the physical addresses PA of the processed data PDTA have consecutive address values. The memory management unit 150 includes a mapping table for mapping the virtual addresses VA to the physical addresses PA. The processing unit 140 processes the input data DTA into a plurality of pages (also referred to as "pages of data" or "data pages") corresponding to a resolution of the display panel 20 and stores first through third pages of data in the memory unit 160 in advance before the transition signal TRS is enabled. For example, according to an embodiment, the phrase "the transition signal TRS is enabled" refers to the control unit 130 responding to the transition signal TRS received from the second interface 120.

The memory unit 160 stores some of the processed data PDTA in advance before the transition signal TRS is enabled under control of the control unit 130. Some of the processed data PDTA are stored in the memory unit 160 in advance before the transition signal TRS is enabled, and the physical addresses PA stored in advance in the memory unit 160 are mapped to consecutive virtual addresses VA. When the transition signal TRS is enabled in response to the transition request TRQ, the data stored in advance in the memory unit 160 is displayed as the image IMG on the display panel 20 without a new image being stored in the memory unit 160 so that the stored new image is displayed on the display panel 20.

Figure 3:
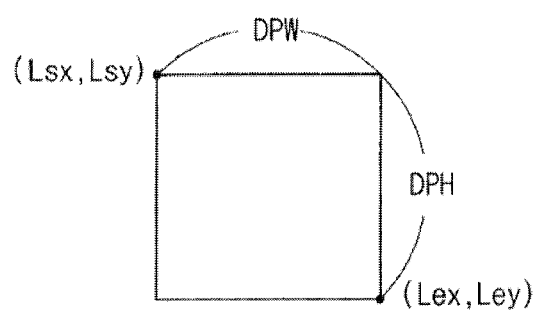
FIG. 3 illustrates an example of a size of the display panel in FIG. 1 according to an exemplary embodiment.

FIG. 3 illustrates an example of a size of the display panel in FIG. 1 according to an exemplary embodiment.

Referring to FIG. 3, the display panel 20 has a resolution corresponding to a width DPW multiplied by a height DPH. The width DPW corresponds to the total number of pixels in a row direction. The height DPH corresponds to the total number of pixels in a column direction. The display panel 20 includes pixels having addresses that include starting addresses Lsx and Lsy and ending addresses Lex and Ley.

Figure 4:
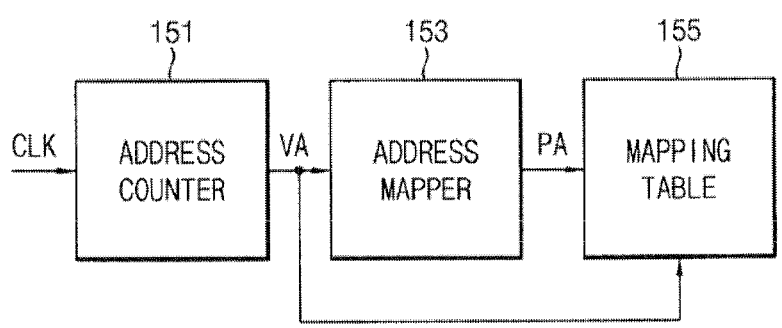
FIG. 4 is a block diagram illustrating an example of the memory management unit in FIG. 2 according to an exemplary embodiment.

FIG. 4 is a block diagram illustrating an example of the memory management unit in FIG. 2 according to an exemplary embodiment.

Referring to FIG. 4, the memory management unit 150 includes an address counter 151, and address mapper 153 and a mapping table 155. The address counter 151 generates the virtual addresses VA of the image IMG to be displayed on the display panel 20 in synchronization with a clock signal CLK. The address mapper 153 generates the physical addresses PA of the data stored in the memory unit 160 to be provided to the memory unit 160 such that the consecutive virtual addresses VA of the image IMG are mapped to the physical addresses PA of the data stored in the memory unit 160. The memory unit 160 stores the processed data PDTA according to the physical address PA. According to an embodiment, the address mapper 155 includes a look-up table and stores the virtual addresses VA and the corresponding physical addresses PA.

Figure 5:
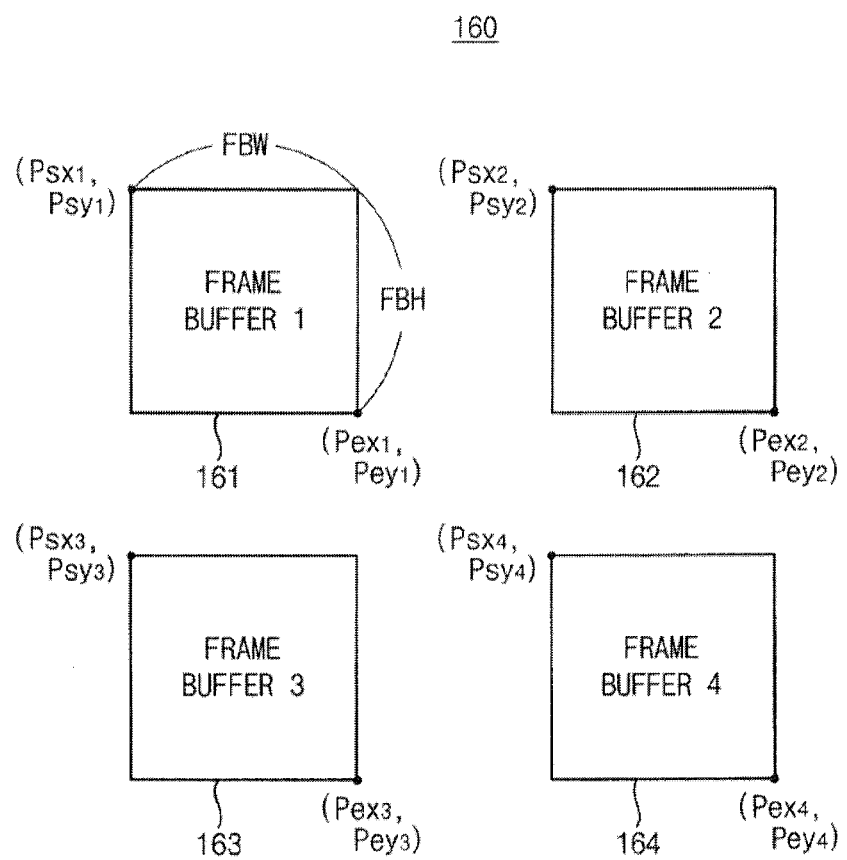
FIG. 5 illustrates an example of the memory unit in FIG. 2 according to an exemplary embodiment.

FIG. 5 illustrates an example of the memory unit in FIG. 2 according to an exemplary embodiment.

Referring to FIG. 5, the memory unit 160 includes first through fourth frame buffers 161 to 164. Each of the first through fourth frame buffers 161 to 164 has a storage capacity corresponding to a width FBW and a height FBH. The width FBW corresponds to the total number of memory cells in one row, and the height FBH corresponds to the total number of memory cells in one column. A first memory cell of the first frame buffer 161 has addresses Psx1 and Psy1, and a last memory cell of the first frame buffer 161 has addresses Pex1 and Pey1. A first memory cell of the second frame buffer 162 has addresses Psx2 and Psy2, and a last memory cell of the second frame buffer 162 has addresses Pex2 and Pey2. A first memory cell of the third frame buffer 163 has addresses Psx3 and Psy3, and a last memory cell of the third frame buffer 163 has addresses Pex3 and Pey3. A first memory cell of the fourth frame buffer 164 has addresses Psx4 and Psy4, and a last memory cell of the fourth frame buffer 164 has addresses Pex4 and Pey4. Each of the first through fourth frame buffers 161 to 164 has physical addresses which are not consecutive to each other. According to an embodiment, the first through fourth frame buffers 161 to 164 are implemented with separate memory areas in one memory.

Figures 6, 7:
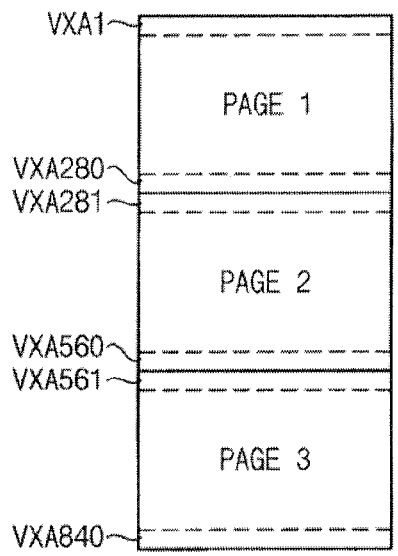
FIG. 6 illustrates data stored in advance in the memory unit according to an exemplary embodiment.
FIG. 7 illustrates an example of the mapping table in FIG. 4 according to an exemplary embodiment.

FIG. 6 illustrates data stored in advance in the memory unit according to an exemplary embodiment.

As shown in FIG. 6, the height DPH of the display panel 20 corresponds to 280 pixels. For example, one column of the display panel 20 includes 280 pixels.

Referring to FIG. 6, first through third pages PAGE1 to PAGE3 of data are stored in advance in the memory unit 160. The first through third pages PAGE1 to PAGE3 of data are stored in the first through third frame buffers 161, 162, and 163, respectively. The consecutive virtual addresses VXA1 to VXA840 of the first through third pages PAGE1 to PAGE3 of data are mapped to the physical addresses of the first through third frame buffers 161, 162 and 163.

FIG. 7 illustrates an example of the mapping table in FIG. 4 according to an exemplary embodiment.

Referring to FIG. 7, among the consecutive virtual addresses VXA1 to VXA840 of the first through third pages PAGE1 to PAGE3 of data, the virtual addresses VXA1 to VXA280 of the first page PAGE1 of data are respectively mapped to the physical addresses Psx1 to Pex1 of the first frame buffer 161, the virtual addresses VXA281 to VXA560 of the second page PAGE2 of data are respectively mapped to the physical addresses Psx2 to Pex2 of the second frame buffer 162, and the virtual addresses VXA561 to VXA840 of the third page PAGE3 of data are respectively mapped to the physical addresses Psx3 to Pex3 of the third frame buffer 163 by the address mapper 153 in advance before the transition signal TRS is enabled.

Figure 8:
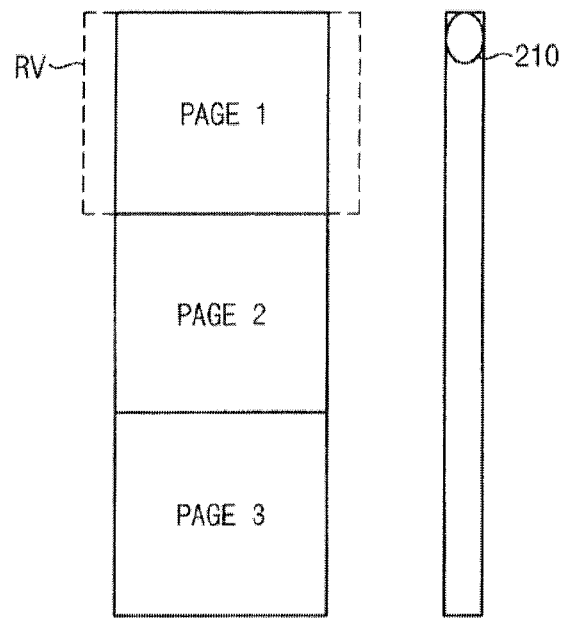
FIGS. 8 through 10 illustrate that the image is transitioned in the display panel according to an exemplary embodiment.
Figure 9:
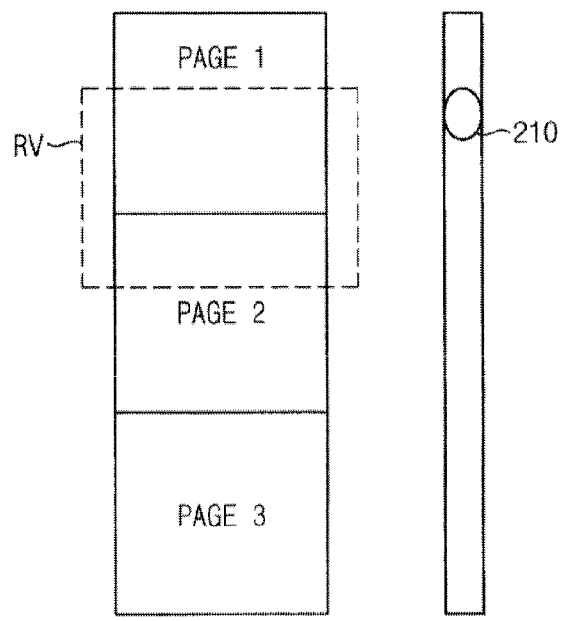
Figure 10:
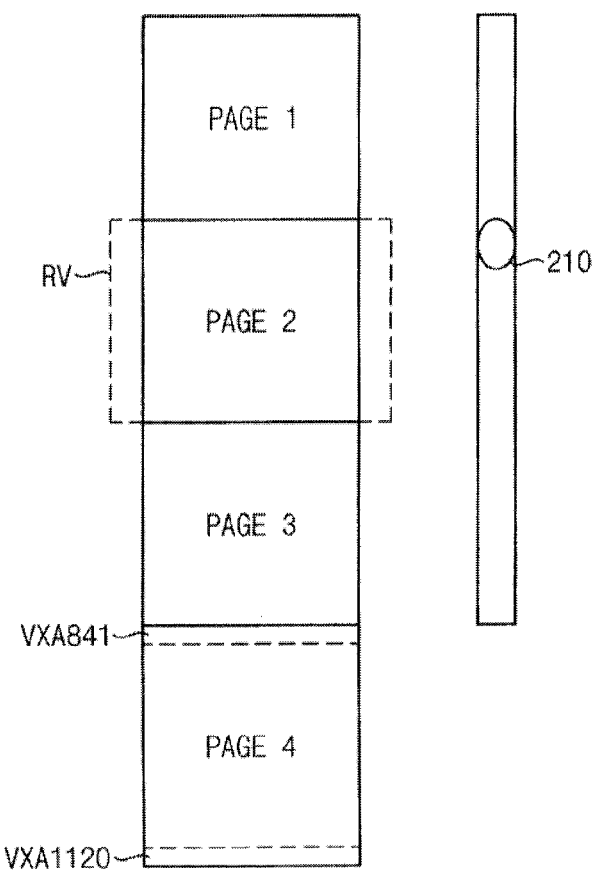

FIGS. 8 through 10 illustrate that the image is transitioned in the display panel according to an exemplary embodiment.

Hereinafter, an operation of the display device 10 is described with reference to FIGS. 1 through 10.

Referring to FIG. 8, the first page PAGE1 of data is displayed as image IMG in the display panel 20 before the transition signal TRS is enabled (for example, before a scroll bar 210 is moved by a user). When the first page PAGE1 of data is displayed as image IMG in the display panel 20, the second and third pages PAGE2 and PAGE3 of data are respectively stored in the second and third frame buffers 162 and 163. Among the consecutive virtual addresses VXA1 to VXA840 of the first through third pages PAGE1 to PAGE3 of data, the virtual addresses VXA281 to VXA560 of the second page PAGE2 of data are respectively mapped to the physical addresses Psx2 to Pex2 of the second frame buffer 162, and the virtual addresses VXA561 to VXA840 of the third page PAGE3 of data are respectively mapped to the physical addresses Psx3 to Pex3 of the third frame buffer 163.

Referring to FIG. 9, when the transition signal TRS is enabled in response to a move of the scroll bar 210, the control unit 130 provides the memory management unit 150 with a range of the virtual addresses VA designated by the transition signal TRS corresponding to the move of the scroll bar 210, and the memory management unit 150 outputs data corresponding to the range of the virtual addresses VA designated by the transition signal TRS to the display panel 20. In FIGS. 8 and 9, a real view RV is an image that is actually displayed on the display panel 20. In the conventional display devices, the first page of data PAGE1 is stored in the frame buffer, and data corresponding to a move of the scroll bar 210 is stored in the frame buffer and is displayed on the display panel 20. Therefore, response time is long, and current is consumed when the data is stored in the frame buffer. However, according to an exemplary embodiment, the first through third pages PAGE1 to PAGE3 of data are stored in advance and data corresponding to the move of the scroll bar 210 is immediately displayed using the address mapping. Therefore, response time is short, and current consumption can be reduced. An intermediate page of data between pages which is previously stored in the frame buffer is displayed on the display panel 20 based on the mapped addresses instead of being newly stored or buffered in the frame buffer.

According to an embodiment, when an intermediate page of data between the first and second pages PAGE1 and PAGE2 is displayed on the display panel 20 in response to the enablement of the transition signal TRS, a fourth page PAGE4 of data subsequent to the third page PAGE3 of data is stored in the fourth frame buffer 164. The virtual addresses VA of the fourth page PAGE4 of data are mapped to the physical addresses of the fourth frame buffer 164 such that the virtual addresses of the fourth page PAGE4 of data are subsequent to the virtual addresses of the third page PAGE3 of data.

Referring to FIG. 10, when the transition to the second page PAGE2 of data is completed in response to the enabled transition signal TRS based on the move of scroll bar 210, the second page PAGE2 of data is displayed as image IMG on the display panel 20. While the second page PAGE2 of data is displayed as image IMG on the display panel 20, the fourth page PAGE4 of data subsequent to the third page PAGE3 of data is stored in the fourth frame buffer 164. The virtual addresses VXA841 to VXA1120 of the fourth page PAGE4 of data are mapped to the physical addresses Psx4 to Pex4 of the fourth frame buffer 164 such that the virtual addresses VXA841 to VXA1120 of the fourth page PAGE4 of data are subsequent to the virtual addresses VXA561 to VXA840 of the third page of data PAGE3.

Figures 11, 12:
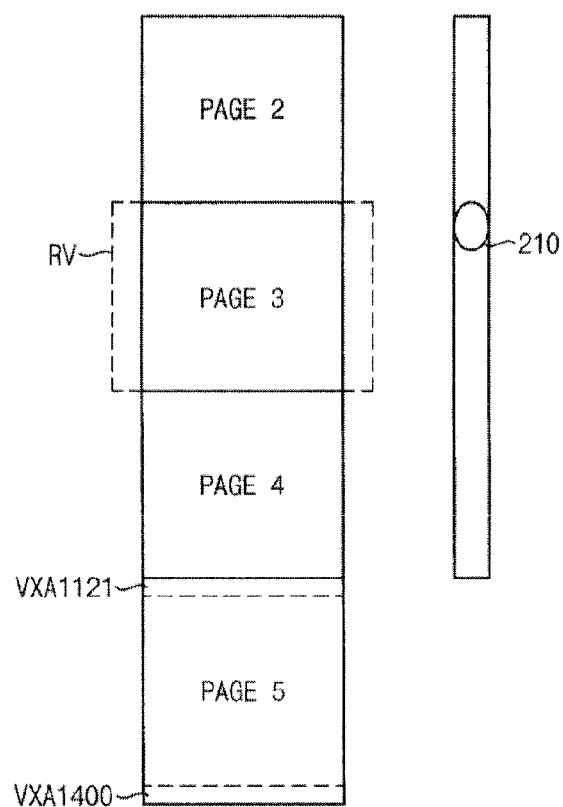
FIG. 11 illustrates an example of the mapping table in FIG. 4 when the transition to the second page of data is completed.
FIG. 12 illustrates that the transition to the third page of data is completed.

FIG. 11 illustrates an example of the mapping table in FIG. 4 when the transition to the second page of data is completed.

When the transition to the second page PAGE2 of data is completed in response to the enabled transition signal TRS, the second page PAGE2 of data is displayed as image IMG on the display panel 20. Referring to FIG. 11, the virtual addresses VXA841 to VXA1120 of the fourth page PAGE4 of data are mapped to the physical addresses Psx4 to Pex4 of the fourth frame buffer 164 such that the virtual addresses VXA841 to VXA1120 of the fourth page PAGE4 of data are subsequent to the virtual addresses VXA561 to VXA840 of the third page PAGE3 of data.

FIG. 12 illustrates that the transition to the third page of data is completed.

Figures 13, 14, 15:
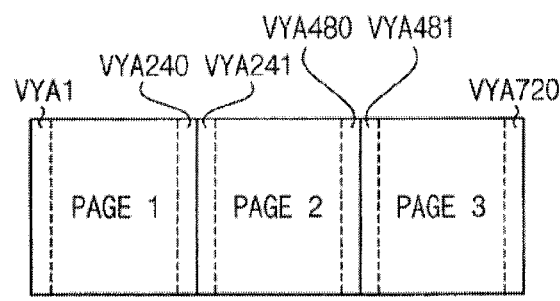
FIG. 13 illustrates an example of the mapping table in FIG. 4 when the transition to the third page of data is completed.
FIG. 14 illustrates data stored in advance in the memory unit according to an exemplary embodiment.
FIG. 15 illustrates an example of the mapping table of FIG. 4 when the image is displayed in the display panel in a landscape mode.

FIG. 13 illustrates an example of the mapping table in FIG. 4 when the transition to the third page of data is completed.

Referring to FIGS. 12 and 13, while the real view RV is transitioned from the second page PAGE2 of data to the third page PAGE3 of data in response to the enabled transition signal TRS, the first frame buffer 161 becomes a free buffer, and a fifth page PAGE5 of data, which is processed by the processing unit 140, is stored in the first frame buffer 161. The virtual addresses VXA1121 to VXA1400 of the fifth page PAGE5 of data are mapped to the physical addresses Psx1 to Pex1 of the first frame buffer 161 such that the virtual addresses VXA1121 to VXA1400 of the fifth page PAGE5 of data are subsequent to the virtual addresses VXA841 to VXA1120 of the fourth page PAGE4 of data. While the real view RV is transitioned from the second page PAGE2 of data to the third page PAGE3 of data, the intermediate pages of data between the second and third pages PAGE2 and PAGE3 of data which are previously stored in the second and third frame buffers 162 and 163 are immediately displayed on the display panel 20 in response to the transition signal TRS instead of being newly stored or buffered in the frame buffers.

It has been described with reference to FIGS. 1 to 13 that the first through third pages PAGE1 to PAGE3 of data are stored in advance in the first through third frame buffers 161, 162 and 163 before the transition signal TRS is enabled and consecutive virtual addresses VXA1 to VXA840 of the first through third pages PAGE1 to PAGE3 of data are mapped to the physical addresses of the first through third frame buffers 161, 162 and 163. However, the embodiments of the present inventive concept are not limited thereto. According to an embodiment, the first and second pages PAGE1 and PAGE2 of data are stored in advance in the first and second frame buffers 161 and 162 before the transition signal TRS is enabled, and the virtual addresses VXA281 to VXA560 of the second page PAGE2 of data are mapped to the physical addresses Psx2 to Pex2 of the second frame buffer 162 such that the virtual addresses VXA281 to VXA560 of the second page PAGE2 of data are subsequent to the virtual addresses VXA001 to VXA280 of the first page PAGE1 of data. While the intermediate pages of data between the first and second pages PAGE1 and PAGE2 of data are displayed on the display panel 20 in response to the transition signal TRS, the third page PAGE3 of data is stored in the third frame buffer 163. The virtual addresses VXA561 to VXA840 of the third page PAGE3 of data are mapped to the physical addresses Psx3 to Pex3 of the third frame buffer 163 such that the virtual addresses VXA561 to VXA840 of the third page PAGE3 of data are subsequent to the virtual addresses VXA281 to VXA560 of the second page PAGE2 of data by the address mapper 153 in the memory management unit 150.

FIG. 14 illustrates data stored in advance in the memory unit according to an exemplary embodiment.

In FIG. 14, the width DPW of the display panel 20 corresponds to 240 pixels. For example, one row of the display panel 20 includes 240 pixels. In FIG. 14, the image IMG is displayed on the display panel 20 in a landscape mode.

FIG. 15 illustrates an example of the mapping table of FIG. 4 when the image is displayed on the display panel in a landscape mode.

Referring to FIGS. 14 and 15, first through third pages PAGE1 to PAGE3 of data are stored in advance in the memory unit 160. The first through third pages PAGE1 to PAGE3 of data are stored in the first through third frame buffers 161, 162 and 163, respectively. The consecutive virtual addresses VYA1 to VYA720 of the first through third pages PAGE1 to PAGE3 of data are mapped to the physical addresses of the first through third frame buffers 161, 162 and 163. Among the consecutive virtual addresses VYA1 to VYA720 of the first through third pages PAGE1 to PAGE3 of data, the virtual addresses VYA1 to VYA240 of the first page PAGE1 of data are respectively mapped to the physical addresses Psy1 to Pey1 of the first frame buffer 161, the virtual addresses VYA241 to VYA480 of the second page PAGE2 of data are respectively mapped to the physical addresses Psy2 to Pey2 of the second frame buffer 162, and the virtual addresses VYA481 to VYA720 of the third pages PAGE3 of data are respectively mapped to the physical addresses Psy3 to Pey3 of the third frame buffer 163 by the address mapper 153 in advance before the transition signal TRS is enabled.

An operation of displaying the image IMG on the display panel 20 in a landscape mode described with reference to FIGS. 14 and 15 is substantially the same as an operation of displaying the image IMG on the display panel in a portrait mode described with reference to FIGS. 6 through 13.

Figure 16:
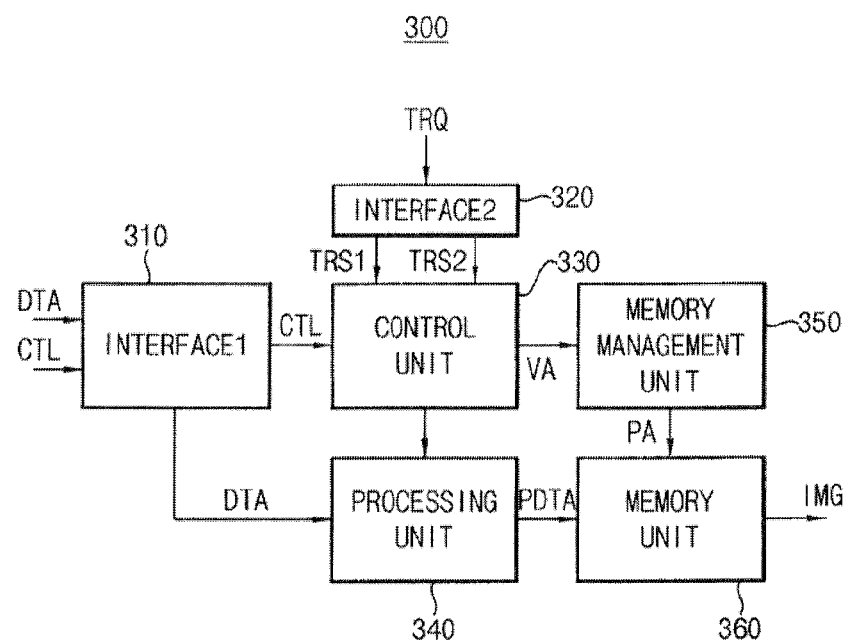
FIG. 16 is a block diagram illustrating another example of a display controller in FIG. 1 according to an exemplary embodiment.

FIG. 16 is a block diagram illustrating an example of the display controller in FIG. 1 according to an exemplary embodiment.

Referring to FIG. 16, the display controller 300 includes a first interface 310, a second interface 320, a control unit 330, a processing unit 340, a memory management unit 350 and a memory unit 360.

The first interface 310 receives data DTA and a control signal CTL from an external source, provides the data DTA to the processing unit 340 and provides the control signal CTL to the control unit 330. The second interface 320 receives a transition request TRQ and provides first and second transition signals TRS1 and TRS2, which are not simultaneously enabled, to the control unit 330.

The control unit 330 controls the processing unit 340 and the memory management unit 350 in response to the control signal CTL. The control unit 330 provides virtual addresses VA designated by one of the first and second transition signals TRS1 and TRS2 to the memory management unit 350 such that the image signal IMG is moved on the display panel 20 in response to the transition signal TRS1 or TRS2.

The processing unit 340 processes the data DTA from the first interface 310, and the memory unit 360 stores processed data PDTA according to physical addresses PA provided from the memory management unit 350. The memory management unit 350 maps the physical addresses PA of the processed data PDTA stored in the memory unit 360 to consecutive virtual addresses VA of the image signal IMG displayed on the display panel 20. The virtual addresses VA corresponding to the physical addresses PA of the processed data PDTA have consecutive address values. The memory management unit 350 includes a mapping table for mapping the virtual addresses VA to the physical addresses PA. The processing unit 340 processes the input data DTA into a plurality of pages (also referred to as "pages of data" or "data pages") corresponding to a resolution of the display panel 20 and stores first through third pages of data in the memory unit 360 in advance before the first and second transition signals TRS1 and TRS2 are enabled.

The memory unit 360 stores some of the processed data PDTA in advance before the first and second transition signals TRS1 and TRS2 are enabled under control of the control unit 330. Some of the processed data PDTA are stored in the memory unit 360 in advance before the first and second transition signals TRS1 and TRS2 are enabled, and the physical addresses PA stored in advance in the memory unit 360 are mapped to consecutive virtual addresses VA. When one of the first and second transition signals TRS1 and TRS2 is enabled in response to the transition request TRQ, the data stored in advance in the memory unit 360 is displayed as the image IMG on the display panel 20 without a new image being stored in the memory unit 360 so that the new image is displayed on the display panel 20.

Figure 17:
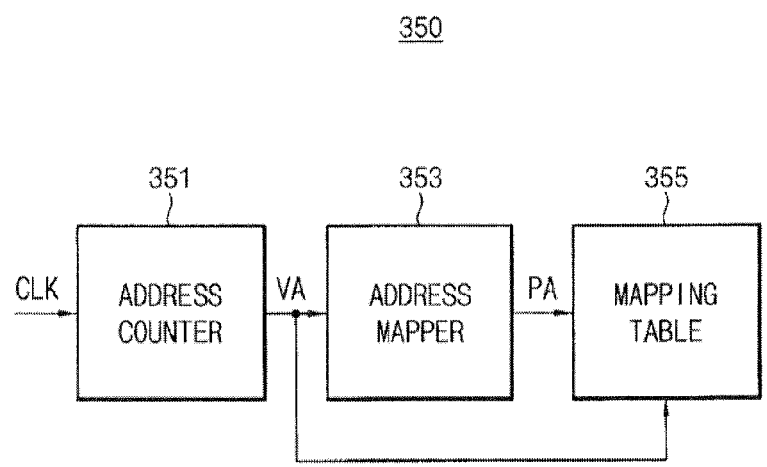
FIG. 17 is a block diagram illustrating an example of the memory management unit in FIG. 16 according to an exemplary embodiment.

FIG. 17 is a block diagram illustrating an example of the memory management unit in FIG. 16 according to an exemplary embodiment.

Referring to FIG. 17, the memory management unit 350 includes an address counter 351, and address mapper 353 and a mapping table 355. The address counter 351 generates the virtual addresses VA of the image IMG to be displayed on the display panel 20 in synchronization with a clock signal CLK. The address mapper 353 generates the physical addresses PA of the data stored in the memory unit 360 to be provided to the memory unit 360 such that the consecutive virtual addresses VA of the image IMG are mapped to the physical addresses PA of the data stored in the memory unit 360. The memory unit 360 stores the processed data PDTA according to the physical addresses PA. According to an embodiment, the address mapper 355 includes a look-up table, and stores the virtual addresses VA and the corresponding physical addresses PA.

Figure 18:
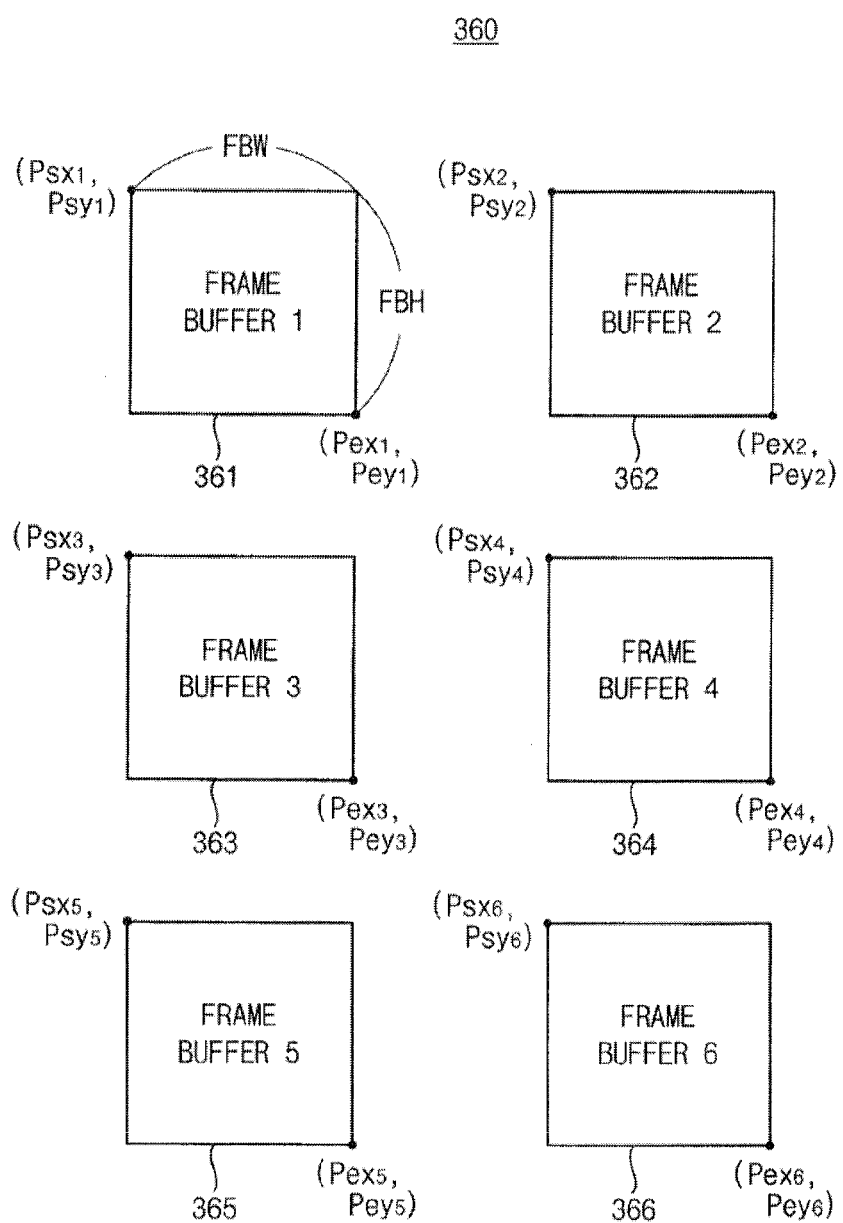
FIG. 18 illustrates an example of the memory unit in FIG. 16 according to an exemplary embodiment.

FIG. 18 illustrates an example of the memory unit in FIG. 16 according to an exemplary embodiment.

Referring to FIG. 18, the memory unit 360 includes first through sixth frame buffers 361 to 364. Each of the first through sixth frame buffers 361 to 366 has a storage capacity corresponding to a width FBW and a height FBH. The width FBW corresponds to the total number of memory cells in one row, and the height FBH corresponds to the total number of memory cells in one column. A first memory cell of the first frame buffer 361 has addresses Psx1 and Psy1, and a last memory cell of the first frame buffer 361 has addresses Pex1 and Pey1. A first memory cell of the second frame buffer 362 has addresses Psx2 and Psy2, and a last memory cell of the second frame buffer 362 has addresses Pex2 and Pey2. A first memory cell of the third frame buffer 363 has addresses Psx3 and Psy3, and a last memory cell of the third frame buffer 363 has addresses Pex3 and Pey3. A first memory cell of the fourth frame buffer 364 has addresses Psx4 and Psy4, and a last memory cell of the fourth frame buffer 364 has addresses Pex4 and Pey4. A first memory cell of the fifth frame buffer 365 has addresses Psx5 and Psy5, and a last memory cell of the fifth frame buffer 365 has addresses Pex5 and Pey5. A first memory cell of the sixth frame buffer 366 has addresses Psx6 and Psy6, and a last memory cell of the fourth frame buffer 366 has addresses Pex6 and Pey6. Each of the first through sixth frame buffers 361 to 366 has physical addresses which are not consecutive to each other. According to an embodiment, the first through sixth frame buffers 361 to 366 are implemented with separate memory areas in one memory.

Figures 19, 20:
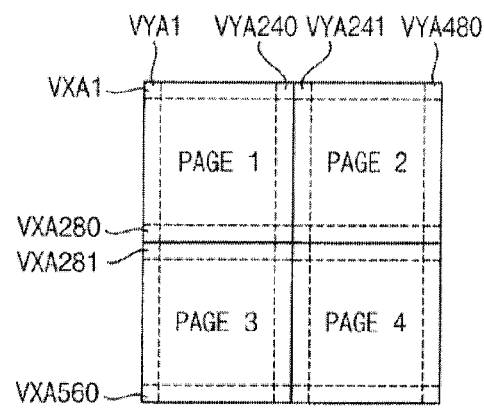
FIG. 19 illustrates data stored in advance in the memory unit in FIG. 16 according to an exemplary embodiment.
FIG. 20 illustrates an example of the mapping table in FIG. 17 according to an exemplary embodiment.

FIG. 19 illustrates data stored in advance in the memory unit in FIG. 16 according to an exemplary embodiment.

In FIG. 19, the height DPH of the display panel 20 corresponds to 280 pixels, and the width DPW of the display panel 20 corresponds to 240 pixels. For example, one column of the display panel 20 includes 280 pixels, and one row of the display panel 20 includes 240 pixels.

Referring to FIG. 19, first through fourth pages PAGE1 to PAGE4 of data are respectively stored in advance in the first through fourth frame buffers 361 to 364 in the memory unit 360 before the first and second transition signals TRS1 and TRS2 are enabled. Virtual row addresses VXA1 to VXA280 of the first and second pages PAGE1 and PAGE2 of data are mapped to corresponding physical row addresses of the first and second frame buffers 361 and 362, and consecutive virtual column addresses VYA1 to VYA480 of the first and second pages PAGE1 and PAGE2 of data are mapped to physical column addresses of the first and second frame buffers 361 and 362. Virtual row addresses VXA281 to VXA560 of the third and fourth pages PAGE3 and PAGE4 of data subsequent to the virtual row addresses VXA1 to VXA280 are mapped to corresponding physical row addresses of the third and fourth frame buffers 363 and 364, and consecutive virtual column addresses VYA1 to VYA480 of the third and fourth pages PAGE3 and PAGE4 of data are mapped to physical column addresses of the third and fourth frame buffers 363 and 364.

FIG. 20 illustrates an example of the mapping table in FIG. 17 according to an exemplary embodiment.

Referring to FIG. 20, among the consecutive virtual row addresses VXA1 to VXA560 of the first through fourth pages PAGE1 and PAGE2 of data, the virtual row addresses VXA1 to VXA280 of the first and second pages PAGE1 and PAGE2 are respectively mapped to the physical row addresses Psx1 to Pex1 of the first frame buffer 361 and the physical row addresses Psx2 to Pex2 of the second frame buffer 362, and the virtual row addresses VXA281 to VXA560 of the third and fourth pages PAGE3 and PAGE4 of data are respectively mapped to the physical row addresses Psx3 to Pex3 of the third frame buffer 363 and the physical row addresses Psx4 to Pex4 of the fourth frame buffer 364 by the address mapper 353 before the first and second transition signals TRS1 and TRS2 are enabled. Among the consecutive virtual column addresses VYA1 to VYA480 of the first through fourth pages PAGE1 to PAGE4 of data, the virtual column addresses VYA1 to VYA240 of the first and third pages PAGE1 and PAGE3 are respectively mapped to the physical column addresses Psy1 to Pey1 of the first frame buffer 361 and the physical column addresses Psy3 to Pey3 of the third frame buffer 363, and the virtual column addresses VYA241 to VYA480 of the second and fourth pages PAGE2 and PAGE4 are respectively mapped to the physical column addresses Psy2 to Pey2 of the second frame buffer 362 and the physical column addresses Psy4 to Pey4 of the fourth frame buffer 364 by the address mapper 353 before the first and second transition signals TRS1 and TRS2 are enabled.

FIGS. 21 through 24 illustrate that an image is transitioned on the display panel according to an exemplary embodiment.

In FIGS. 21 through 24, a real view RV is an image that is actually displayed on the display panel 20.

Hereinafter, an operation of the display controller 300 is described with reference to FIGS. 16 through 24.

Figure 21:
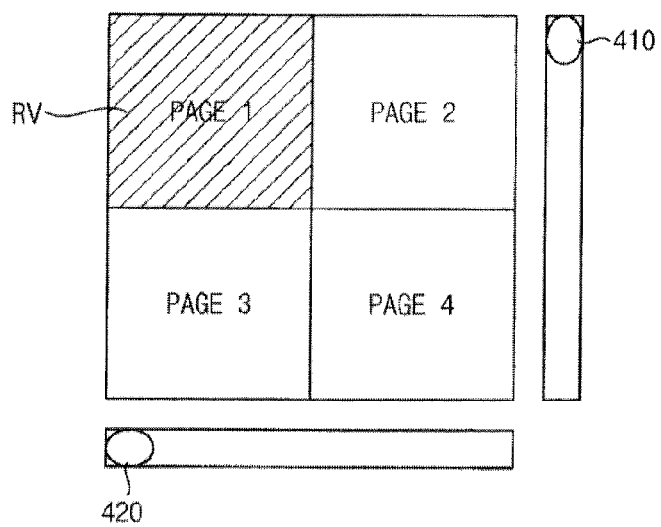
FIGS. 21 through 24 illustrate that the image is transitioned in the display panel according to an exemplary embodiment.

Referring to FIG. 21, the first page PAGE1 of data is displayed as image IMG on the display panel 20 before the first and second transition signals TRS1 and TRS2 are enabled (for example, before first and second scroll bars 410 and 420 are moved by a user). When the first page PAGE1 of data is displayed as image IMG on the display panel 20, the second through fourth pages PAGE2 to PAGE4 of data are respectively stored in the second through fourth frame buffers 362 to 364. The second page PAGE2 of data is subsequent to the first page PAGE1 of data in a row direction, the third page PAGE3 of data is subsequent to the first page PAGE1 of data in a column direction, and the fourth page PAGE4 of data is subsequent to the second page PAGE2 of data in the column direction and subsequent to the third page PAGE3 of data in the row direction.

Figure 22:
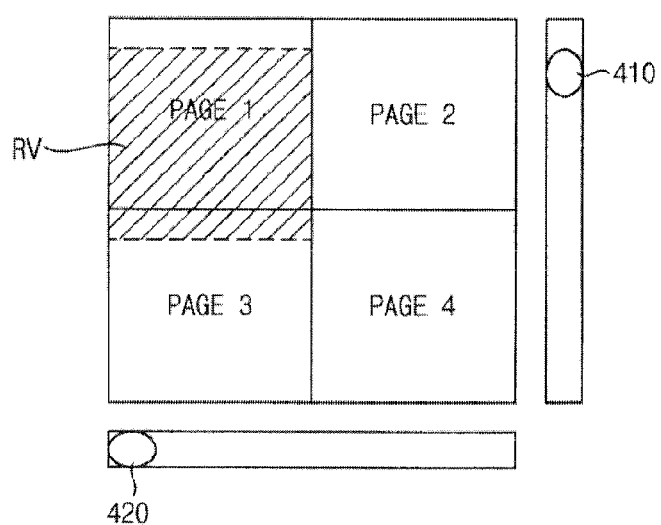

Referring to FIG. 22, when the first transition signal TRS1 is enabled in response to a move of the first scroll bar 410, the control unit 330 provides a range of virtual row addresses VXA designated by the first transition signal TRS1 corresponding to the move of the first scroll bar 410, and the memory management unit 350 outputs data designated by the physical row addresses PXA corresponding to the range of virtual row addresses VXA designated by the first transition signal TRS1 to the display panel 20.

Figure 23:
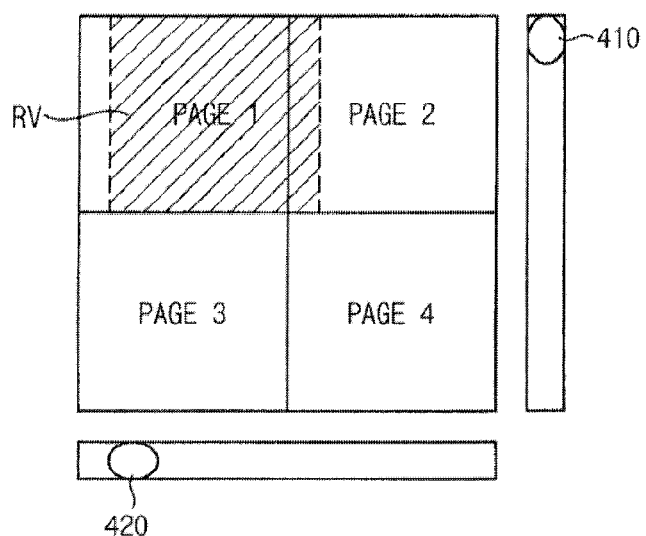

Referring to FIG. 23, when the second transition signal TRS2 is enabled in response to a move of the second scroll bar 420, the control unit 330 provides a range of virtual column addresses VYA designated by the second transition signal TRS2 corresponding to the move of the second scroll bar 420, and the memory management unit 350 outputs data designated by the physical column addresses PYA corresponding to the range of virtual column addresses VYA designated by the second transition signal TRS2 to the display panel 20.

Figure 24:
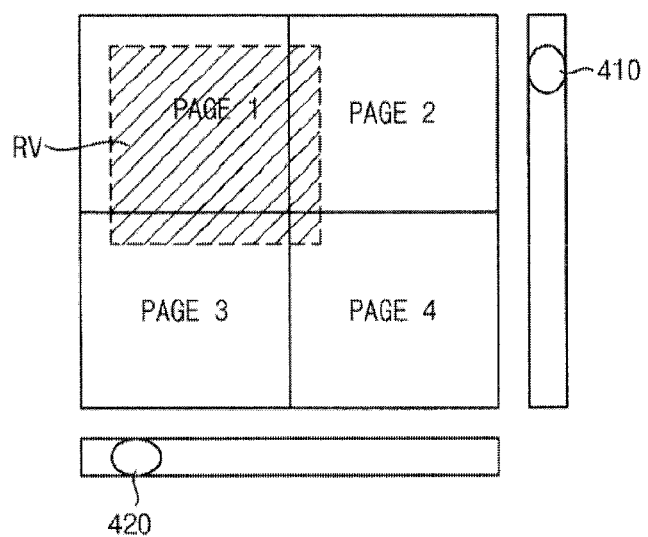

Referring to FIG. 24, when the first and second transition signals TRS1 and TRS2 are enabled (according to an embodiment, the first and second transition signals TRS1 and TRS2 are not simultaneously enabled) in response to moves of the first and second scroll bars 410 and 420 (according to an embodiment, the first second scroll bars 410 and 420 are not simultaneously moved), the control unit 330 provides a first range of virtual row addresses VXA designated by the first transition signal TRS1 corresponding to the move of the first scroll bar 410 and a second range of virtual column addresses VYA designated by the second transition signal TRS2 corresponding to the move of the second scroll bar 420, and the memory management unit 350 outputs data designated by physical row addresses PXA and physical column addresses PYA to the display panel 20. The physical row addresses PXA correspond to the range of virtual row addresses VXA designated by the first transition signal TRS1, and the physical column addresses PYA correspond to the range of virtual column addresses VYA designated by the second transition signal TRS2.

In the conventional display devices, the first page PAGE1 of data is stored in the frame buffer, and data corresponding to moves of the first and second scroll bar 410 and 420 is stored or buffered in the frame buffer and the stored or buffered data is displayed on the display panel 20. Therefore, response time is long, and current is consumed when the data is stored or buffered in the frame buffer. However, according to an exemplary embodiment, the first through fourth pages of data PAGE1 to PAGE4 are stored in advance in the frame buffers, and data corresponding to the moves of the first and second scroll bars 410 and 420 is immediately displayed using the address mapping. Therefore, response time is short, and current consumption can be reduced. An intermediate page of data between pages, which is previously stored or buffered in the frame buffer, is displayed on the display panel 20 based on the mapped addresses instead of being newly stored or buffered in the frame buffer.

According to an embodiment, when the data corresponding to the moves of the first and second scroll bars 410 and 420 is displayed on the display panel 20, a fifth page PAGE5 of data subsequent to the third page PAGE3 of data in a column direction is stored in the fifth frame buffer 365, and a sixth page PAGE6 of data subsequent to the fourth page PAGE4 of data in the column direction is stored in the sixth frame buffer 366, and the virtual row addresses of the fifth and sixth pages PAGE5 and PAGR6 of data are mapped to the physical row addresses of the fifth and sixth frame buffers 365 and 366 to be subsequent to the virtual row addresses VXA281 to VXA560 of the third and fourth pages PAGE3 and PAGE4 of data.

Figure 25:
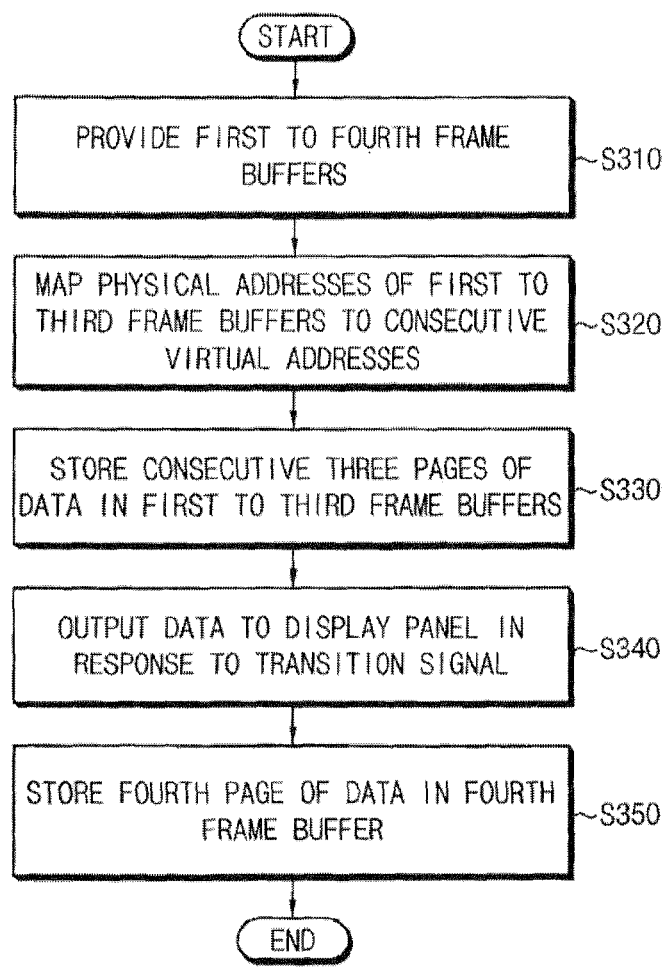
FIG. 25 is a flow chart illustrating a method of displaying data according to an exemplary embodiment.

FIG. 25 is a flowchart illustrating a method of displaying data according to an exemplary embodiment.

Hereinafter, a method of displaying data is described with reference to FIGS. 1 to 15 and FIG. 25.

First through fourth frame buffers 161 to 164 are provided in a memory unit (S310). The width FBW of each of the first through fourth frame buffers 161 to 164 corresponds to the total number of memory cells in one row, and the height FBH of each of the first through fourth frame buffers 161 to 164 corresponds to the total number of memory cells in one column. Each of the first through fourth frame buffers 161 to 164 has physical addresses which are not consecutive to each other. According to an embodiment, the first through fourth frame buffers 161 to 164 are implemented with separate memory areas in one memory.

The physical addresses PA of the first through third frame buffers 161 to 163 are mapped to the consecutive virtual addresses VA of an image displayed on the display panel 20 as illustrated in FIG. 7 (S320). For example, among the consecutive virtual addresses VXA1 to VXA840 of the first through third pages PAGE1 to PAGE3 of data, the virtual addresses VXA1 to VXA280 of the first page PAGE1 of data are respectively mapped to the physical addresses Psx1 to Pex1 of the first frame buffer 161, the virtual addresses VXA281 to VXA560 of the second page PAGE2 of data are respectively mapped to the physical addresses Psx2 to Pex2 of the second frame buffer 162, and the virtual addresses VXA561 to VXA840 of the third page PAGE3 of data are respectively mapped to the physical addresses Psx3 to Pex3 of the third frame buffer 163 (S320). The consecutive three pages PAGE1 to PAGE3 of data are stored in the first through third frame buffers 161 to 163 before the transition signal TRS is enabled (S330). When the transition signal TRS is enabled, data corresponding to a range of virtual addresses designated by the transition signal TRS is output to the display panel 20 (S340), and the fourth page PAGE4 of data is stored in the fourth frame buffer 164 as illustrated in FIG. 10 (S350). The virtual addresses of the fourth page PAGE4 of data are mapped to the physical addresses of the fourth frame buffer 164 such that the virtual addresses of the fourth page PAGE4 of data are subsequent to the virtual addresses of the third page PAGE3 of data.

Figure 26:
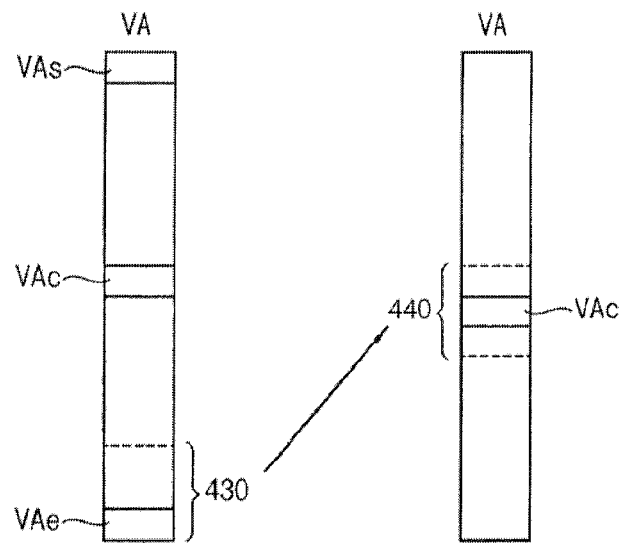
FIG. 26 illustrates that the memory management unit remaps the virtual addresses according to an exemplary embodiment.

FIG. 26 illustrates that the memory management unit remaps the virtual addresses according to an exemplary embodiment.

Referring to FIG. 26, the virtual addresses, which are mapped to the physical addresses of the frame buffers, have a range defined by a start address VAs and an end address VAe designated by the transition signal TRS as illustrated in FIGS. 8 through 10. When a range 430 of virtual addresses VA includes the end address VAe, the range 430 of the virtual addresses VA is remapped to a center range 440 including a center address AVc for preventing mapping from becoming impossible. When the range 430 of the virtual addresses VA is remapped to the center range 440 of the virtual addresses VA, the physical addresses of the frame buffers, which correspond to the range 430 of virtual addresses VA are not changed.

Figure 27:
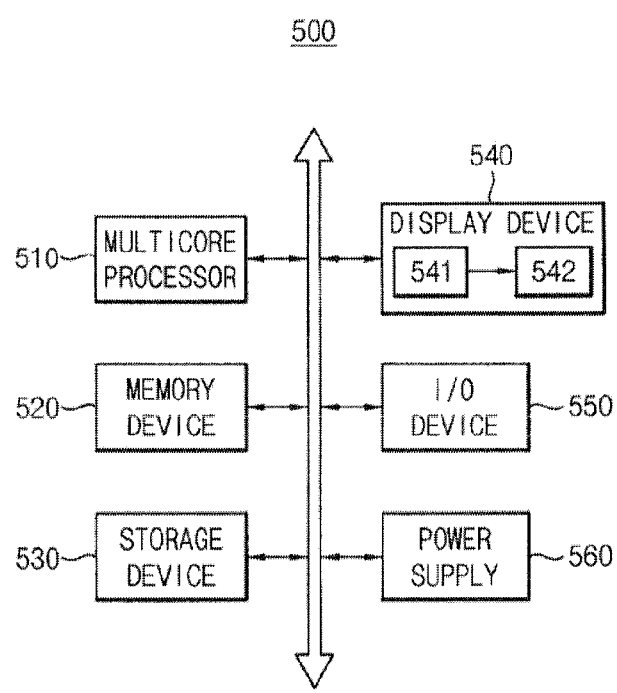
FIG. 27 is a block diagram illustrating an electronic device including a display device according to an exemplary embodiment.

FIG. 27 is a block diagram illustrating an electronic device including a display device according to an exemplary embodiment.

Referring to FIG. 27, the electronic device 500 includes a multi-core processor 510, a memory device 520, a storage device 530, an input/output device 550, a power supply 560, and a display device 540. The display device 540 includes a display controller 541 and a display panel 542. According to an embodiment, the display device 540 is substantially the same as the display device 10 of FIG. 1. The display device 540 stores first through third pages of data in advance, and data corresponding to a move of the scroll bar is immediately displayed in response to the enabled transition signal. Therefore, the display device 540 has reduced response time and current consumption.

According to an embodiment, the electronic device 500 includes a plurality of ports for communicating with a video card, a sound card, a memory card, a USB device, other electric devices, etc. According to an embodiment, the electronic device 800 includes a desktop computer, a laptop computer, a digital camera, a video camcorder, a cellular phone, a smart phone, a portable multimedia player (PMP), a personal digital assistant (PDA), a MP3 player, a navigation device, etc.

The multi-core processor 510 controls the memory device 520, the storage device 530, the input/output device 550 and the display device 540. The memory device 520 is coupled to the multi-core processor 510 via a bus (e.g., an address bus, a control bus, a data bus, etc). For example, according to an embodiment, the memory device 520 includes a dynamic random access memory (DRAM), a static random access memory (SRAM), and/or a non-volatile memory (e.g., an erasable programmable read-only memory (EPROM), an electrically erasable programmable read-only memory (EEPROM), a flash memory device, etc). According to an embodiment, the storage device 530 includes a hard disk drive (HDD), a compact disk read-only memory (CD-ROM), a solid state drive (SSD), etc. The input/output device 550 includes at least one input device (e.g., a keyboard, a keypad, a touchpad, a mouse, etc) and at least one output device (e.g., a printer, a LCD display, a speaker, etc). The power supply 560 supplies a power voltage for the electronic device 500.

The embodiments of the present inventive concept may be applied to various display devices, such as notebook computers, laptop computers and mobile devices.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display controller comprising:
a processing unit configured to process input data;
a memory unit configured to store a first data of the processed input data before a transition signal is enabled;
a memory management unit configured to map consecutive virtual addresses of an image displayed on a display panel to physical addresses of the first data stored in the memory unit; and
a control unit configured to control the processing unit and the memory management unit in response to a control signal and configured to provide a range of first virtual addresses among the consecutive virtual addresses designated by the transition signal in response to enablement of the transition signal such that the image is displayed on the display panel,
wherein the first virtual addresses correspond to second data included in at least two consecutive pages of the first data
wherein the memory management unit comprises an address mapper configured to map the consecutive virtual addresses to the physical addresses,
wherein the memory unit comprises at least first through fourth frame buffers separate from each other, and
wherein at least one of the first through fourth frame buffers has non-consecutive physical addresses corresponding to one of consecutive virtual addresses.

2. The display controller of claim 1, wherein the processing unit is configured to process the input data into consecutive pages of the first data, each of the consecutive pages of the first data corresponding to a resolution of the display panel, and is configured to store a first page of the first data in the first frame buffer, a second page of the first data in the second frame buffer, and a third page of the first data in the third frame buffer under control of the control unit before the transition signal is enabled.

3. The display controller of claim 2, wherein the address mapper is configured to map consecutive virtual addresses of the first through third pages of the first data to physical addresses of the first through third frame buffers.

4. The display controller of claim 3, wherein the processing unit is configured to store a fourth page of the first data in the fourth frame buffer in response to enablement of the transition signal, wherein the fourth page of the first data is subsequent to the third page of the first data.

5. The display controller of claim 4, wherein the address mapper is configured to map virtual addresses of the fourth page of the first data to physical addresses of the fourth frame buffer such that the virtual addresses of the fourth page of the first data are subsequent to the virtual addresses of the third page of the first data.

6. The display controller of claim 4, wherein the processing unit is configured to store a fifth page of the first data subsequent to the fourth page of the first data in the first frame buffer in response to the enablement of the transition signal,
and wherein the address mapper is configured to map virtual addresses of the fifth page of the first data to physical addresses of the first frame buffer such that the virtual addresses of the fifth page of the first data are subsequent to virtual addresses of the fourth page of the first data.

7. A display device comprising:
a display panel; and
a display controller configured to control the display panel, the display controller comprising:
 a processing unit configured to process input data;
 a memory unit configured to store a first data of the processed input data before a transition signal is enabled;
 a memory management unit configured to map consecutive virtual addresses of an image displayed on the display panel to physical addresses of the first data stored in the memory unit; and
 a control unit configured to control the processing unit and the memory management unit in response to a control signal and configured to provide a range of first virtual addresses among the consecutive virtual addresses designated by the transition signal in response to enablement of the transition signal such that the image is displayed on the display panel,
 wherein data corresponding to an intermediate page between at least two consecutive pages of the first data which is previously stored in the memory unit is displayed on the display panel based on the mapped consecutive virtual addresses instead of being newly stored or buffered in the memory unit
wherein the memory unit comprises at least first through fourth frame buffers separate from each other, and
wherein at least one of the first through fourth frame buffers has non-consecutive physical addresses corresponding to one of consecutive virtual addresses.

8. The display device of claim 7, wherein the memory unit comprises at least first through fourth frame buffers separate from each other, and
wherein the processing unit is configured to process the input data into consecutive pages of the first data, each of the consecutive pages of the first data corresponding to a resolution of the display panel, and is configured to store a first page of the first data in the first frame buffer, a second page of the first data in the second frame buffer, and a third page of the first data in the third frame buffer under control of the control unit before the transition signal is enabled.

9. The display device of claim 8, wherein when the enabled transition signal is configured to designate an intermediate page of the first data between the first page of the first data and the second page of the first data, and wherein the control unit is configured to control the memory management unit such that an image corresponding to physical addresses mapped to virtual addresses of the intermediate page of the first data is displayed on the display panel.

10. The display device of claim 8, wherein when the enabled transition signal is configured to designate an intermediate page of the first data between the first page of the first data and the second page of the first data, and wherein the control unit is configured to control the processing unit such that the fourth page of the first data subsequent to the third page of the first data is stored in the fourth frame buffer.

11. The display device of claim 7, wherein when the range of the first virtual addresses includes an end address of the first virtual addresses, and wherein the memory management unit is configured to remap the range including the end address of the first virtual addresses to a center range including a center address of the first virtual addresses.

12. The display device of claim 7, wherein the transition signal is configured to designate a range of an image displayed on the display panel.

* * * * *